US008786643B2

(12) United States Patent
Seetzen

(10) Patent No.: US 8,786,643 B2
(45) Date of Patent: Jul. 22, 2014

(54) EDGE-LIT LOCAL DIMMING DISPLAYS, DISPLAY COMPONENTS AND RELATED METHODS

(75) Inventor: Helge Seetzen, Westmount (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 86 days.

(21) Appl. No.: 13/378,759

(22) PCT Filed: Jul. 6, 2010

(86) PCT No.: PCT/US2010/041105
§ 371 (c)(1),
(2), (4) Date: Dec. 16, 2011

(87) PCT Pub. No.: WO2011/005792
PCT Pub. Date: Jan. 13, 2011

(65) Prior Publication Data
US 2012/0092395 A1 Apr. 19, 2012

Related U.S. Application Data

(60) Provisional application No. 61/223,675, filed on Jul. 7, 2009.

(51) Int. Cl.
*G09G 5/10* (2006.01)
*G02B 6/35* (2006.01)
*G09G 3/34* (2006.01)
*G02F 1/1335* (2006.01)
*G02F 1/167* (2006.01)
*G09G 3/36* (2006.01)

(52) U.S. Cl.
CPC ............... *G09G 3/3426* (2013.01); *G02B 6/357* (2013.01); *G09G 3/344* (2013.01); *G02F 2001/133601* (2013.01); *G02F 2001/133545* (2013.01); *G02F 2202/04* (2013.01); *G09G 2360/16* (2013.01); *G09G 3/3433* (2013.01); *G02F 2201/44* (2013.01); *G02F 1/167* (2013.01); *G09G 2300/023* (2013.01); *G02B 6/0033* (2013.01); *G02B 6/3536* (2013.01); *G02F 1/133615* (2013.01); *G09G 3/3611* (2013.01); *G09G 2320/0646* (2013.01)
USPC ............... 345/690; 345/102; 349/58; 349/65; 362/606; 362/612; 362/97.1; 362/97.2; 362/97.3

(58) Field of Classification Search
CPC ........... G09G 3/3426; G09G 2300/023; G02F 1/167; G02F 1/133615; G02F 1/133555; G02B 6/0068
USPC ........ 345/690, 102; 362/97.1–97.3, 606, 612; 349/58, 65
See application file for complete search history.

(56) References Cited

U.S. PATENT DOCUMENTS

| 5,341,231 A | 8/1994 | Yamamoto |
| 5,537,233 A | 7/1996 | Miura |

(Continued)

FOREIGN PATENT DOCUMENTS

| CN | 1856812 | 11/2006 |
| GB | 2404448 | 2/2005 |

(Continued)

OTHER PUBLICATIONS

Mossman, M., et al., "Controlled Frustration of TIR by Electrophoresis of Pigment Particles", Appl. Opt. 44(9), Mar. 2005.

(Continued)

*Primary Examiner* — Lun-Yi Lao
*Assistant Examiner* — Peter D McLoone

(57) ABSTRACT

An edge-lit display having a front modulator in the top layer of an optical package and an extractor in at least one of the top and bottom layers. A control system is connected to control the extraction mechanism to project light which approximates a desired image onto the front modulator, estimate a pattern of light incident on the front modulator, and control the front modulator based on the estimated pattern.

21 Claims, 7 Drawing Sheets

(56) References Cited

U.S. PATENT DOCUMENTS

| | | | |
|---|---|---|---|
| 5,856,855 A * | 1/1999 | Mol et al. | 349/65 |
| 6,266,473 B1 * | 7/2001 | Saccomanno et al. | 385/140 |
| 6,621,541 B1 * | 9/2003 | Choi | 349/113 |
| 6,977,766 B2 | 12/2005 | Stevens | |
| 7,277,609 B2 | 10/2007 | Cassarly | |
| 7,322,731 B2 * | 1/2008 | Epstein et al. | 362/609 |
| 7,366,393 B2 * | 4/2008 | Cassarly et al. | 385/146 |
| 7,695,180 B2 * | 4/2010 | Schardt et al. | 362/625 |
| 7,764,334 B2 * | 7/2010 | Kitagawa et al. | 349/65 |
| 7,903,194 B2 * | 3/2011 | Epstein et al. | 349/62 |
| 7,942,531 B2 * | 5/2011 | Whitehead et al. | 353/30 |
| 8,023,065 B2 * | 9/2011 | Epstein et al. | 349/62 |
| 8,089,582 B2 * | 1/2012 | Sekiguchi et al. | 349/65 |
| 8,111,447 B2 * | 2/2012 | Fairly et al. | 359/296 |
| 8,172,401 B2 * | 5/2012 | Whitehead et al. | 353/30 |
| 8,199,103 B2 * | 6/2012 | Sung et al. | 345/107 |
| 8,330,901 B2 * | 12/2012 | Chen | 349/74 |
| 2006/0115214 A1 * | 6/2006 | Cassarly | 385/31 |
| 2006/0256244 A1 | 11/2006 | Jak | |
| 2006/0290651 A1 * | 12/2006 | Verhaegh et al. | 345/107 |
| 2006/0290842 A1 * | 12/2006 | Epstein et al. | 349/113 |
| 2006/0290844 A1 | 12/2006 | Epstein | |
| 2006/0291238 A1 * | 12/2006 | Epstein et al. | 362/600 |
| 2007/0086086 A1 | 4/2007 | Cassarly | |
| 2007/0159678 A1 * | 7/2007 | Verhaegh et al. | 359/265 |
| 2007/0280593 A1 | 12/2007 | Brychell | |
| 2008/0030650 A1 * | 2/2008 | Kitagawa et al. | 349/65 |
| 2008/0232135 A1 * | 9/2008 | Kinder et al. | 362/615 |
| 2008/0297695 A1 * | 12/2008 | Sekiguchi et al. | 349/65 |
| 2009/0096967 A1 * | 4/2009 | Sung et al. | 349/114 |
| 2009/0316253 A1 * | 12/2009 | Fairley et al. | 359/292 |
| 2010/0302480 A1 * | 12/2010 | Whitehead et al. | 349/65 |
| 2011/0216387 A1 * | 9/2011 | Whitehead et al. | 359/238 |
| 2011/0249446 A1 * | 10/2011 | Epstein et al. | 362/296.09 |
| 2012/0026434 A1 * | 2/2012 | Chen | 349/106 |
| 2012/0140513 A1 * | 6/2012 | Shibata et al. | 362/602 |
| 2012/0150513 A1 * | 6/2012 | Fang | 703/2 |
| 2012/0257144 A1 * | 10/2012 | Shibata et al. | 349/65 |

FOREIGN PATENT DOCUMENTS

| | | |
|---|---|---|
| WO | 02/069030 | 9/2002 |
| WO | 03/077013 | 9/2003 |
| WO | 2004079437 | 9/2004 |
| WO | 2005/107237 | 11/2005 |
| WO | 2006/010244 | 2/2006 |
| WO | 2007002232 | 1/2007 |
| WO | 2008026179 | 3/2008 |
| WO | 2008032248 | 3/2008 |
| WO | 2008045200 | 4/2008 |
| WO | 2008125926 | 10/2008 |

OTHER PUBLICATIONS

Mossman, M., et al., "A Novel Reflective Image Display Using Total Internal Reflection", J. Displays25(5), Nov. 2004.

Feenstra Johan, "Electrowetting Displays for Mobile Multimedia Applications", in: A.K. Bowmilk Z. Li & P.J. Bos: "Mobile Displays: Technology and Applications" Jul. 18, 2008, John Wiley & Sons Ltd.

Den Boer, Willem, "Active Matrix Liquid Crystal Displays" Referex 2005, p. 182-184.

De Greef, et al., "Adaptive Scanning, 1-D Dimming and Boosting Backlight for LCD-TV systems" Journal of the SID, vol. 14, No. 12, 2006, pp. 1103-1110.

* cited by examiner

EDGE-LIT LOCAL DIMMING DISPLAYS, DISPLAY COMPONENTS AND RELATED METHODS

CROSS-REFERENCE TO RELATED APPLICATIONS

This application claims priority to U.S. Provisional Patent Application No. 61/223,675 filed Jul. 7, 2009, hereby incorporated by reference in its entirety.

TECHNICAL FIELD

This application relates to edge-lit displays.

BACKGROUND

A number of patents and applications relating to display technology invented or co-invented by the present inventor have been published, including (each hereby incorporated by reference for all purposes):
PCT Publication No. WO 2002/069030 published 6 Sep. 2002 and entitled "High Dynamic Range Display Devices";
PCT Publication No. WO 2003/077013 published 18 Sep. 2003 and entitled "High Dynamic Range Display Devices";
PCT Publication No. WO 2005/107237 published 10 Nov. 2005 and entitled "Method for Efficient Computation of Image Frames for Dual Modulation Display Systems Using Key Frames"; and
PCT Publication No. WO 2006/010244 published 2 Feb. 2006 and entitled "Rapid Image Rendering on Dual-Modulator Displays".

There are a number of patents and published patent applications relating to edge-lit displays, including:
PCT Publication No. WO 2008/125926 entitled "Controllable Light-guide and Display Device"; PCT Publication No. WO 2008/045200 entitled "Optical Loss Structure Integrated in an Illumination Apparatus"; PCT Publication No. WO 2007/002232 entitled "Illumination Light Unit for Edge-lit Displays and System Using Same"; PCT Publication No. WO 2004/079437 entitled "A Display Device and an Illumination System Therefor";
U.S. Pat. No. 7,366,393 entitled "Light Enhancing Structures with Three or More Arrays of Elongate Features";
U.S. Pat. No. 7,277,609 entitled "Methods for Manipulating Light Extraction from a Light Guide"; U.S. Pat. No. 6,977,766 entitled "Display Device with Side-illuminated Cell"; U.S. Pat. No. 5,537,233 entitled "Direct-vision/projection Type Liquid-crystal Display Having Light Source at the Edge of a Gap Between Two Liquid Crystal Panels";
U.S. Pat. No. 5,341,231 entitled "Liquid Crystal Display Device with Edge Lit Lightguide Reflecting Light to Back Reflector by Total Internal Reflection"; and,
U.S. Patent Application Publication No. US2007/0280593 entitled "High Contrast Edge-lit Signs and Images".

The inventor has determined a need for improved edge-lit displays.

SUMMARY

The following embodiments and aspects thereof are described and illustrated in conjunction with systems, tools and methods which are meant to be exemplary and illustrative, not limiting in scope.

The invention may be embodied in a variety of ways. Some aspects provide displays which may comprise, for example, televisions, video monitors, computer displays, home cinema displays, digital theater displays, specialized displays such as displays for medical imaging, displays in simulators such as flight simulators, and the like. Other non-limiting aspects of the invention provide methods for displaying images (still and/or video), control systems for displays, and display backlights.

One aspect of the invention provides a display comprising an optical package having a top layer on a side thereof facing toward a viewing area, and a bottom layer on a side thereof facing away from the viewing area. The top layer comprises a front modulator having a plurality of individually-controllable elements, each of the individually-controllable elements having a variable transmissivity. A plurality of light sources are positioned along at least one edge of the optical package. The light sources are configured to direct light into the optical package. An extractor is provided in at least one of the top layer and the bottom layer. The extractor has a plurality of individually-controllable segments configured to direct varying levels of light toward the front modulator. A control system is connected to control the front modulator and the extractor. The control system is configured to receive image data specifying a desired image, control the extractor to project light which approximates the desired image onto the front modulator, estimate a pattern of light incident on the front modulator, and control the front modulator based on the estimated pattern.

Further aspects of the invention and details of example embodiments are discussed below. Additionally, various advantages of certain embodiments of the invention can be appreciated with reference to the detailed description and accompanying drawings. For example, an edge-lit display, according to an embodiment of the invention, can offer one or more of the following advantages, among others: reduced number of light emitters, two dimensional local dimming, uniform light piping along a long distance, thinner display, and reduced energy use.

BRIEF DESCRIPTION OF DRAWINGS

The accompanying drawings illustrate non-limiting example embodiments.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
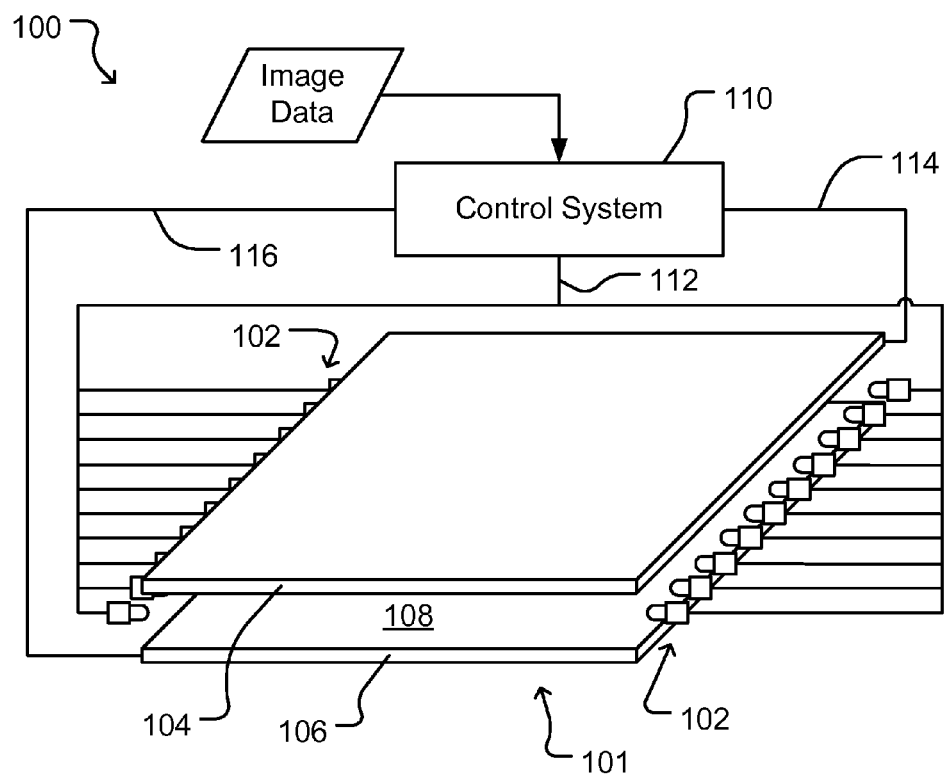
FIG. 1 shows a display according to one embodiment.

FIG. 1 shows a display 100 according to one embodiment. Display 100 comprises a plurality of light sources 102 positioned to direct light into an optical package 101. Optical package 101 comprises a first or "top" layer 104, which faces toward a viewing area, and a second or "bottom" layer 106. Top and bottom layers 104 and 106 define an optical cavity 108 there between. Optical cavity 108 may have a thickness in the range of about 2 mm to about 15 mm in some embodiments. In some embodiments, optical cavity 108 may have a thickness of less than about 8 mm, or less than about 5 mm.

The terms top and bottom, and related terms, are used herein to refer to the directions toward and away from the viewing area, respectively, rather than referring to relative heights.

In many situations where display 100 might be used, top and bottom layers 104 and 106 will both be generally vertically oriented. Display 100, and other displays described herein, may, for example, be used in televisions, computer monitors, electronic billboards, or other contexts where still or video images are displayed to viewers.

In the illustrated embodiment, light sources 102 are arranged along two opposed sides of cavity 108. Other arrangements are also possible. For example, light sources may be arranged along only one side of cavity 108, along two adjacent sides of cavity 108, along three sides of cavity 108, or around the entire periphery of cavity 108. Also, although top and bottom layers 104 and 106 are generally rectangular and define a generally cuboid cavity 108 in the illustrated embodiment, it is to be understood that top and bottom layers 104 and 106 could have different shapes.

Display 100 also comprises a control system 110 configured to receive image data. Control system 110 is connected to control light sources 102 through brightness control lines 112. Control system 110 may be configured for controlling light sources 102 in response to image data, as described below. Light from light sources 102 is directed into cavity 108, reflected between top layer 104 and bottom layer 106, and ultimately directed toward the viewing area to produce a desired image, as described below.

Control system 110 is also connected to control a front modulator within top layer 104 by transmission control lines 114, and to control an extractor within bottom layer 106 by extraction control lines 116. The front modulator may comprise a plurality of individually controllable elements each having a variable transmissivity. The extractor may comprise a modulatable reflective layer in some embodiments. The reflectance of selected segments of the modulatable reflective layer within bottom layer 106 may be varied by control system 110 to achieve local dimming within optical package 101 and provide a pattern of light to the front modulator within top layer 104, as described further below.

Figure 1A:
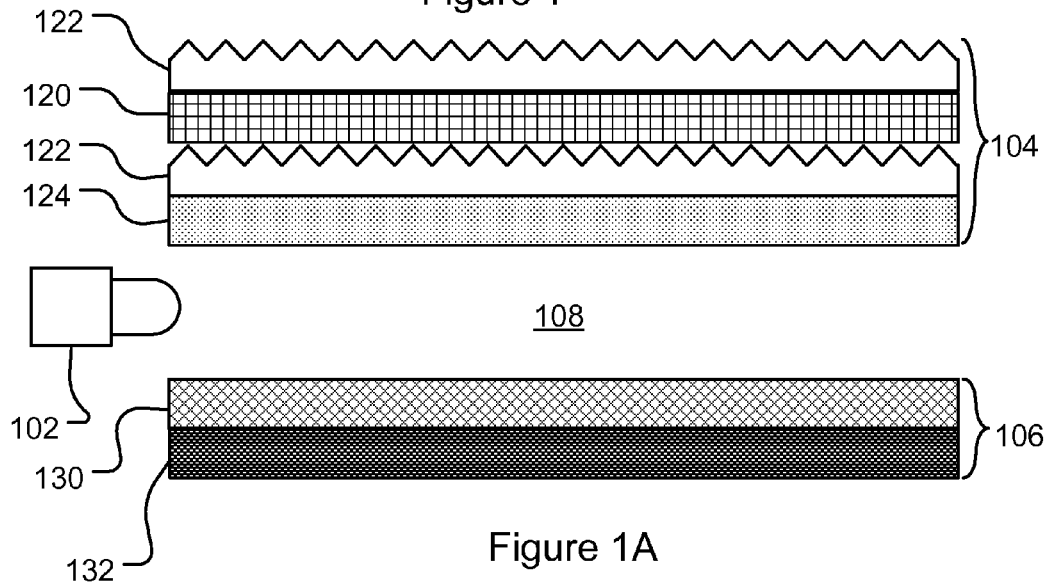
FIG. 1A shows a partial sectional view of the top and bottom layers of the display of FIG. 1.

As shown for example in FIG. 1A, top layer 104 may comprise a transmission-type liquid crystal display (LCD) 120 which serves as the front modulator and a diffuser 124. One or more micro structured optical film(s) 122 may be provided above and/or below LCD 120. Other arrangements for top layer 104 are also possible. LCD 120 may comprise a plurality of individually-controllable elements, each having a variable transmissivity which may be controlled by control system 110, as described below.

Optical film(s) 122 may comprise, for example, one or more Brightness Enhancing Films (BEF) or Dual Brightness Enhancing Films (DBEF) such as Vikuiti™ films manufactured by 3M™, or variations thereof with different structures (such as, for example, cylindrical bumps instead of prismatic ridges). In some embodiments, optical film(s) 122 may include holographic diffusers. In some embodiments, optical film(s) 122 may be omitted, which may provide an increased viewing angle at the expense of some brightness.

Bottom layer 106 may comprise a modulatable reflective layer 130 mounted on a substrate 132. Modulatable reflective layer 130 comprises a plurality of separately controllable segments, each having a reflectivity which may be controlled by control system 110, as described below.

The spatial resolution of modulatable reflective layer 130 (i.e., the number of separately controllable segments) may be lower than the spatial resolution of LCD 120. For example, in some embodiments, the spatial resolution of LCD 120 may be approximately 100 to 20,000 times greater than the spatial resolution of modulatable reflective layer 130.

Modulatable reflective layer 130 may have a relatively low contrast ratio. For example, in some embodiments, the contrast ratio achievable by controlling segments of modulatable reflective layer 130 may be as low as 5:1.

Modulatable reflective layer 130 may produce a somewhat blurry pattern of reflected light. For example, in some embodiments, the intensity of light reflected from modulatable reflective layer 130 may be smoothly varying between adjacent segments which are controlled to have differing reflective properties.

In some embodiments, modulatable reflective layer 130 may comprise, for example, an electronic paper display (such as those manufactured by E Ink™ Corporation, and others), an electrophoretic display, an electro-wetting display, a reflective LCD, a cholesteric LCD, or the like. Modulatable reflective layer 130 may be configured to be controllably reflective over a contrast range of at least about 5:1. Modulatable reflective layer 130 may be configured to have a response time which is comparable to the refresh rate of LCD 120.

In some embodiments, modulatable reflective layer 130 may selectively specularly reflect or absorb light to varying degrees in each of the plurality of segments thereof to create darkened regions in corresponding areas of the pattern of light incident on LCD 120. In other embodiments, modulatable reflective layer 130 may selectively specularly reflect or scatter light to varying degrees in each of the plurality of segments thereof to create brightened regions in corresponding areas of the pattern of light incident on LCD 120. Scattering and absorbing may also be combined in some embodiments, wherein each segment of modulated reflective layer 130 can be varied between substantially specularly reflecting and various degrees of scattering and absorbing. For example, in some embodiments modulatable reflective layer 130 comprises an electro-wetting display with a specularly reflective backing, in which each pixel of the modulatable reflective layer 130 comprises one or more small drops of colored fluid and an electrode.

In some embodiments, modulatable reflective layer 130 may be configured to limit the light extracted by certain segments thereof. For example, different segments of modulatable reflective layer 130 may be configured to have different extraction efficiencies (i.e., ratios of the maximum amounts of light which may be directed toward the front modulator to the total amount of light present at that location). For example, modulatable reflective layer 130 may be configured to have a relatively low extraction efficiency in segments near the light sources, and a relatively high extraction efficiency in segments farther away from the light sources. In embodiments such as the example shown in FIG. 1 where light sources 102 are positioned along two opposed sides of display 100, modulatable reflective layer 130 may be configured to have an extraction efficiency profile which has a maximum in the middle of display 100 (in segments farthest from light sources 102), and decreases toward the edges of display 100.

Figure 2:
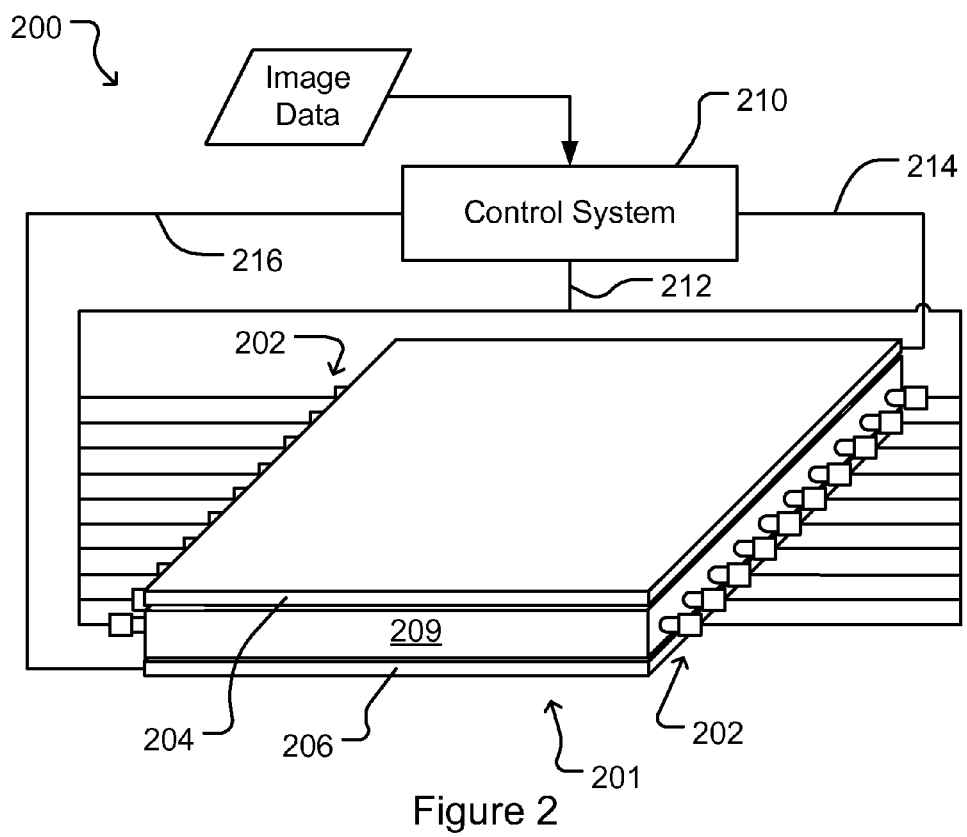
FIG. 2 shows a display according to another embodiment which includes a waveguide and an extractor below the waveguide.
Figure 3:
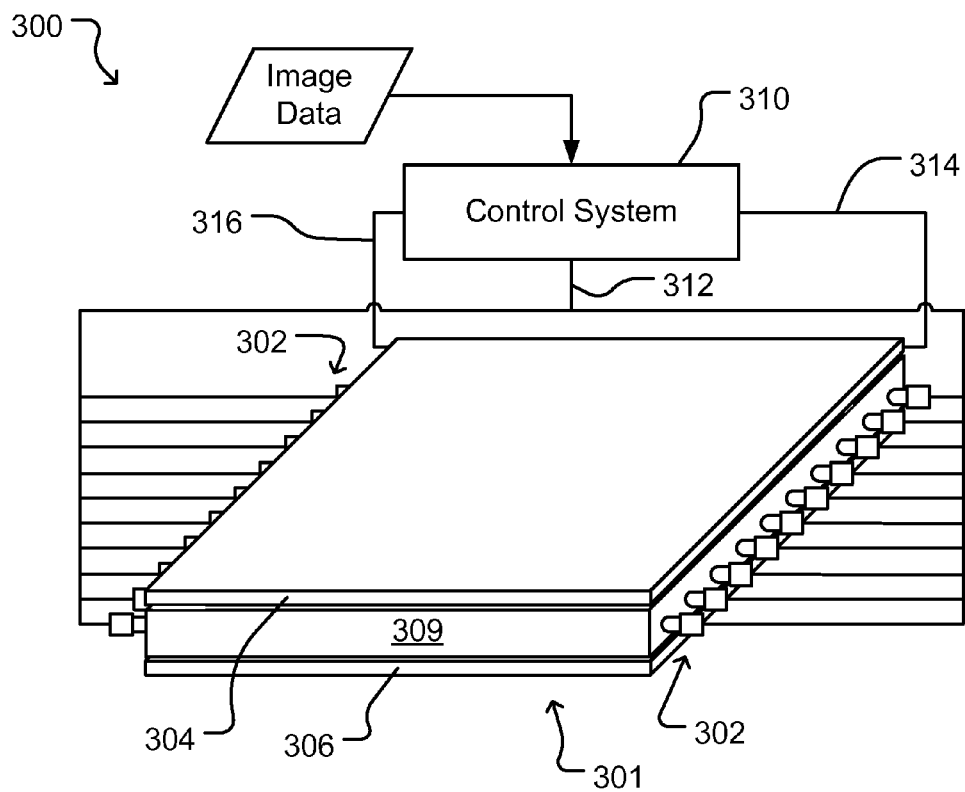
FIG. 3 shows a display according to another embodiment having an extractor above the waveguide.
Figure 4:
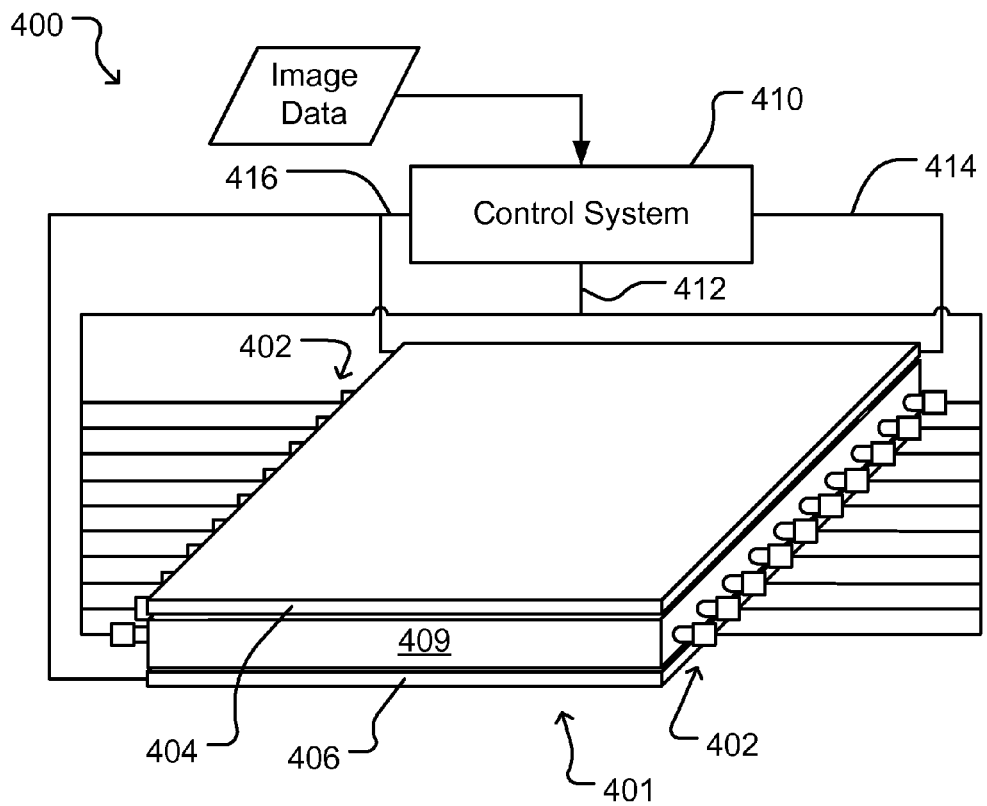
FIG. 4 shows a display according to another embodiment having an extractor both above and below the waveguide.

FIGS. 2, 3 and 4 show displays 200, 300 and 400 similar to display 100 of FIG. 1. Where applicable, elements of display 200/300/400 in FIG. 2 which correspond to elements of display 100 of FIG. 1 display are indicated using corresponding reference characters (for example, 2xx/3xx/4xx in place of 1xx), and not described in detail to avoid repetition.

Display 200 comprises an optical waveguide 209 instead of an open optical cavity. Waveguide 209 has an index of refraction greater than the mediums adjacent to the top and bottom surfaces thereof, such that a majority of light from light sources 202 entering the edges of waveguide 209 undergoes total internal reflection (TIR). In some embodiments, the material of waveguide 209 has an index of refraction of at least 2. Waveguide 209 may have structured top and/or bottom surfaces to improve TIR efficiency and/or extraction efficiency. Waveguide 209 may additionally or alternatively have coatings applied to the top and/or bottom surfaces thereof to improve TIR efficiency and/or extraction efficiency. Many types of structured surfaces for waveguide 209 are possible, including, for example and without limitation, microprisms, hemispheres, other partial spheres, cylindrical lenses, and other shapes. Coatings for waveguide 209 could include, for example and without limitation, diffuse dot patterns, reflective elements such as small metallic reflectors, and other coatings.

In some embodiments, waveguide 209 comprises microstructured prismatic ridges on both the top and bottom surfaces thereof. The prisms can be designed so that light rays incident thereupon at a limited range of angles undergo TIR while incident light outside that range of angles pass through the prisms and leave waveguide 209.

In some embodiments, waveguide 209 has reflective polarizers on the top and bottom surfaces thereof. The reflective polarizers may comprise, for example, DBEF or similar products. In such embodiments light from light sources 202 may be polarized such that it is substantially entirely reflected by the reflective polarizers. Diffusely reflecting particles may be provided in some regions to randomize the polarization so that some of the randomized reflected rays in such regions exit waveguide 209 in such regions.

In some embodiments, waveguide 209 has structured top and bottom surfaces configured to produce a desired extraction efficiency profile. For example, in some embodiments waveguide 209 may be structured to have a relatively low extraction efficiency in areas near the edges thereof where light sources 202 are positioned in comparison to areas away from light sources 202. For example, where light sources 202 are arranged around the edges of waveguide 209, areas around the edges of waveguide 209 may be structured to permit extraction of a smaller proportion of light in comparison to areas in a central portion of waveguide 209. In embodiments such as the example shown in FIG. 2 where light sources 202 are positioned along two opposed sides of display 200, waveguide 209 may be configured to have an extraction efficiency profile which has a maximum along a line in the middle thereof equidistant from both rows of light sources 202, and decreases toward the edges of waveguide 209.

Waveguide 209 may have structured top and bottom surfaces configured to equalize the potential light output from different areas of waveguide 209 in some embodiments. In other embodiments, waveguide 209 may be structured to deliberately create uneven light outputs. For example, the waveguide 209 may be structured to emit light in a manner that closely approximates the light output of an array of LEDS in a direct-lit LED backlight. In such embodiments, the properties of waveguide 209 may vary with a spatial period the same as that of an array of LEDS. In such embodiments, the front modulator may be controlled in substantially the same manner as if it were direct-lit by a LED backlight.

Figure 2A:
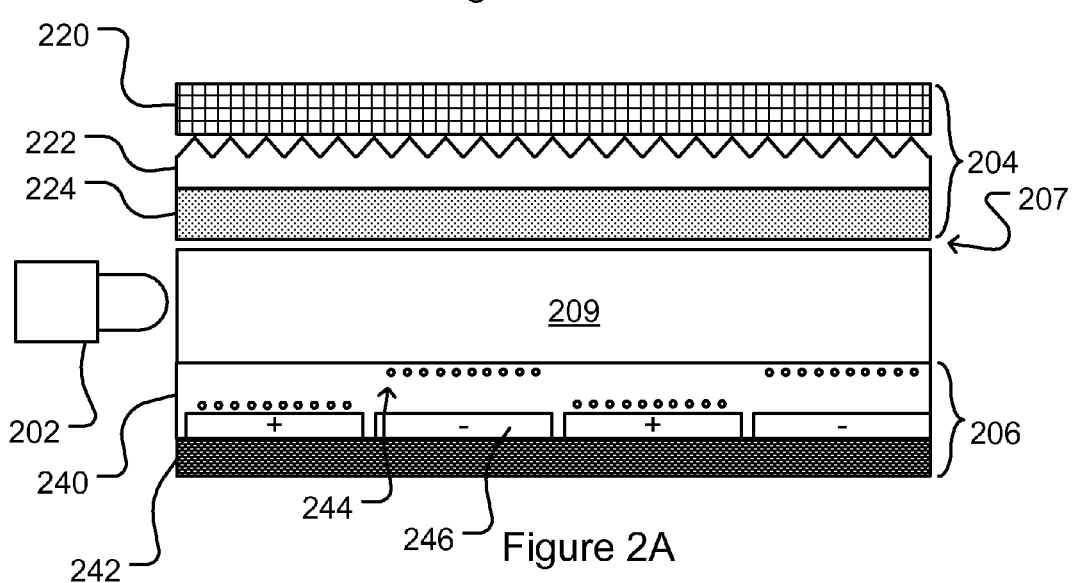
FIG. 2A shows a partial sectional view of the top and bottom layers of the display of FIG. 2.

As shown in FIG. 2A, top layer 204 of display 200 may be similar to top layer 104 of display 100. A gap 207, which may be an air gap, may be provided between top layer 204 and waveguide 209 to improve TIR efficiency.

Bottom layer 206 comprises an electrophoretic medium 240 between waveguide 209 and a suitable substrate 242. In some embodiments, electrophoretic medium 240 may comprise a liquid with a relatively low index of refraction, such as for example a fluorinated hydrocarbon liquid. Other types of relatively low index of refraction liquids could also be used as electrophoretic medium 240. A plurality of charged particles 244 are suspended in electrophoretic medium 240.

A plurality of electrodes 246 are mounted on substrate 242 and configured to have voltages applied thereto by control system 210 through extraction control lines 216. Electrodes 246 move electrically charged particles 244 suspended in electrophoretic medium 240 either away from or toward waveguide 209 in a region near each electrode 246, depending on the polarity of the applied voltage. When particles 244 in a region are moved close to the bottom surface of waveguide 209 (i.e., within less than about one half of the wavelength of the light within waveguide 209), TIR is prevented or "frustrated" in that region. (See M. Mossman and L. Whitehead, "A novel reflective image display using total internal reflection", J. Displays 25(5), November 2004, and M. Mossman and L. Whitehead, "Controlled frustration of TIR by electrophoresis of pigment particles", Appl. Opt. 44(9), March 2005 for more on this phenomenon. Each article is hereby incorporated by reference for all purposes)

In some embodiments, particles 244 may comprise absorptive particles such as, for example, pigment particles or dye molecules. In such embodiments, light within waveguide 209 is absorbed in regions where particles 244 are moved close to waveguide 209, resulting in corresponding darkened regions of the pattern of light incident on LCD 220.

In other embodiments, particles 244 may comprise reflective particles, such as, for example white pigmented particles. In such embodiments, light within waveguide 209 is scattered in regions where particles 244 are moved close to waveguide 209, resulting in corresponding brightened regions of the pattern of light incident on LCD 220. Such embodiments may provide increased efficiency in comparison to embodiments where particles 244 are absorptive.

In some embodiments, two types of particles having different optical properties and opposite electrical charges may be suspended in electrophoretic medium 240. For example, a first type of particle in medium 240 may be reflective, and have a negative charge, and a second type of particle in medium 240 may be transparent and have a positive charge.

When one of electrodes 246 has a positive voltage applied thereto, the negatively charged reflecting particles are attracted to that electrode and the positively charged transparent particles are repelled by that electrode, such that the positively charged transparent particles are moved close to the bottom surface of waveguide 209 in the region of that electrode. Conversely, when one of electrodes 246 has a negative voltage applied thereto, the negatively charged reflecting particles are repelled by that electrode and the positively charged transparent particles are attracted to that electrode, such that the negatively charged reflecting particles are moved close to the bottom surface of waveguide 209 in the region of that electrode. As one skilled in the art will appreciate, transparent particles may be unnecessary in embodiments where medium 240 is transparent. However, even in such embodiments, transparent particles may be included to provide charge-balancing if medium 240 is non-conducting.

Figure 3A:
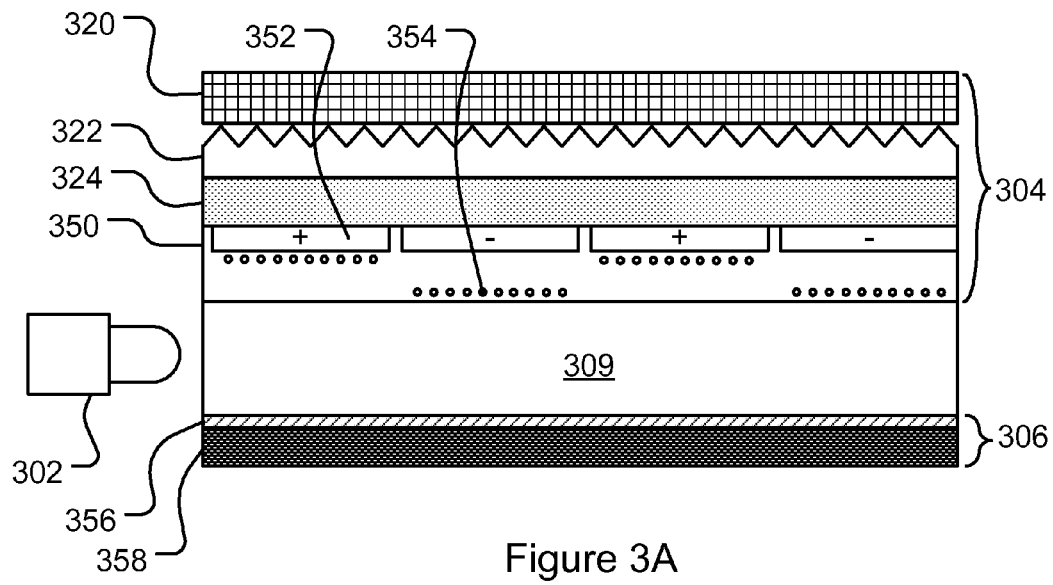
FIG. 3A shows a partial sectional view of the top and bottom layers of the display of FIG. 3.

FIGS. 3 and 3A show a display 300 according to another embodiment. In display 300, an extractor is provided in top layer 304 of optical package 301. Extraction control lines 316 are connected to electrodes 352 in top layer 304. Electrodes 352 may be constructed from a transparent material such as, for example Indium Tin Oxide (ITO), to reduce the optical impact of electrodes 352. Electrophoretic layer 350 may also be transparent, or may provide some small degree of diffusion. By varying the voltage applied to electrodes 352, particles 354 suspended in electrophoretic layer 350 may be moved toward and away from the upper surface of waveguide 309. Particles 354 may be diffusely reflecting in some embodiments. In other embodiments, particles 354 may comprise a transparent material having an index of refraction greater than the index of refraction of waveguide 309.

In some embodiments, portions of electrophroetic layer 350 may be made "always reflective," for example by inserting pieces of non-modulated high index material into layer 350, or by not including electrodes in such portions so those particles 354 remain stationary.

Likewise, portions of electrophroetic layer 350 may be made "always diffuse" by making them from a fixed piece of diffuser. Such configurations may provide a non-uniform extraction pattern which may be applied, for example, as discussed above. For example, near the light sources 302 only about 25% of the surface area of electrophroetic layer 350 may be controllable or "active," and the other 75% may be permanently reflecting to achieve TIR. This ensures that some light is available for extraction near the middle of the display or at other locations away from light sources 320. The proportion of active area may be larger in such locations.

Figure 4A:
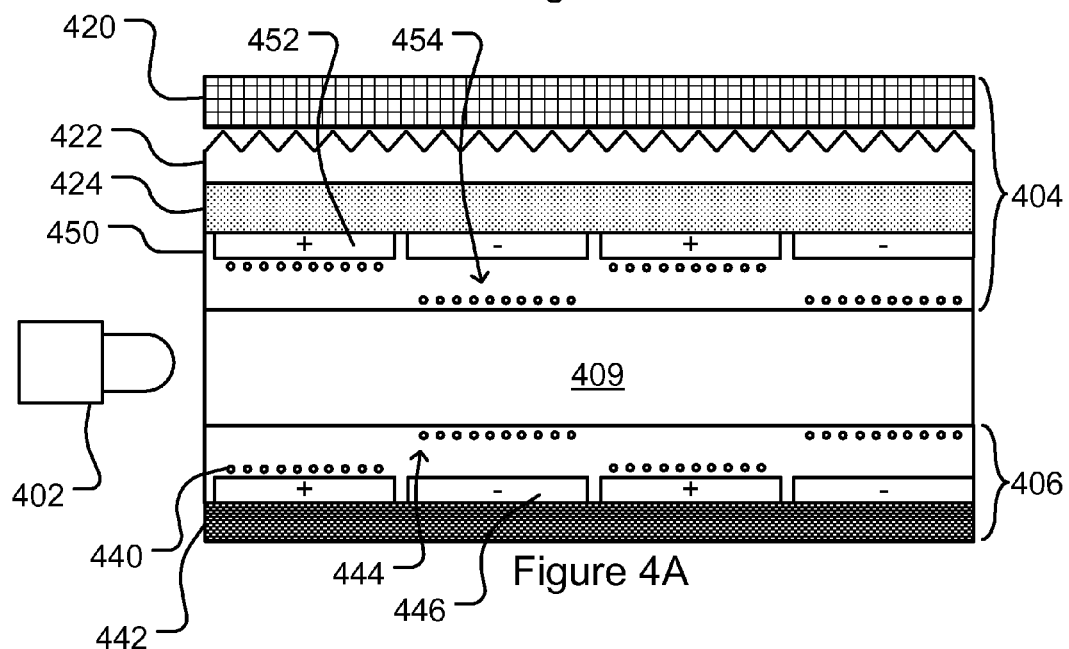
FIG. 4A shows a partial sectional view of the top and bottom layers of the display of FIG. 4.

FIGS. 4 and 4A shows a display 400 according to another embodiment. In display 400, extractors are provided in both top and bottom layers 404 and 406 of optical package 401. Extraction control lines 416 are connected to electrodes 452 in top layer 404 and to electrodes 446 in bottom layer 406. Electrodes 452 may be constructed from a transparent material. Electrodes 446 may be constructed from a transparent or non-transparent material.

Top and bottom layers 404 and 406 are not necessarily controlled by identical signals. In some embodiments, different signals are supplied to control top and bottom layers 404 and 406. The areas and locations of the controllable segments of top and bottom layers 404 and 406 are not necessarily the same although they may be. In some embodiments, it is desirable that the light output from waveguide 409 is controllable to provide a smoothly-varying approximation of an image to be displayed. In such embodiments, providing segments on top and bottom layers 404 and 406 that are different sizes and/or differently aligned on waveguide 409 may facilitate obtaining such a smoothly-varying approximation of the desired image.

Figure 5:
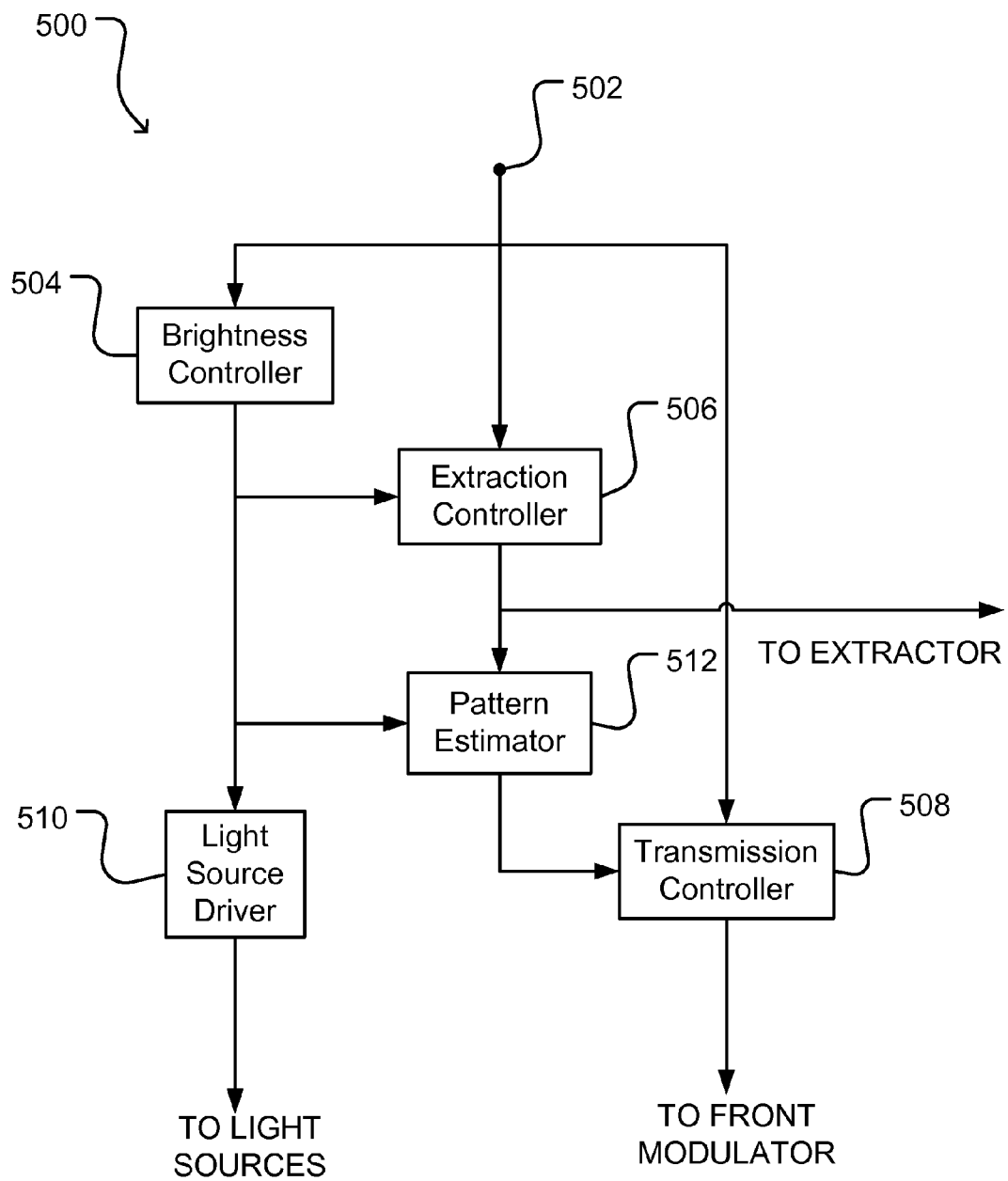
FIG. 5 shows a control system according to one embodiment.

FIG. 5 shows a control system 500 according to another embodiment. Control system 500 may be used in or with a display similar to those described above. Control system 500 has an input 502 for receiving image data. Image data may comprise, for example one of a series of frames of video data. Input 502 is connected to provide image data to a brightness controller 504, an extraction controller 506, and a transmission controller 508.

Brightness controller 504 measures accumulated luminance of pixels of image data, and provides a brightness control signal to light source driver 510. Brightness controller 504 is also connected to provide the brightness control signal to extraction controller 506, and to a pattern estimator 512, as described further below.

In some embodiments, brightness controller 504 may be omitted or bypassed, and the light sources may be driven at a constant level regardless of the luminance of image data. Such embodiments have the advantage of greater simplicity, at the expense of some efficiency and/or contrast ratio, since more light may be generated than required for low-luminance images.

In some embodiments, brightness controller 504 may measure the maximum luminance required for the brightest pixel(s) of the image data, and set the level for driving the light sources to ensure that such maximum is achievable. In other embodiments, brightness controller 504 may measure the accumulated luminance of all of the pixels of image data and cause light source driver 510 to drive all of the light sources at a single level based on the total overall luminance. Brightness controller 504 may also measure the average, or a weighted average, of luminances of pixels of the image, and drive the light sources based on the average or weighted average luminance.

In some embodiments, control system 500 is configured to drive light sources and the segments that extract light from a waveguide such that each pixel of a front modulator driven by transmission controller 508 receives somewhat more light than specified by image data such that the image can be made to match the image data by controlling the transmissivities of the pixels of the front modulator to block a relatively small fraction of the light from reaching the viewing areas. Brightness controller 504 may, for example, analyze an entire frame of image data on-the-fly before that frame is displayed. Such analysis may introduce some frame delay. Any such frame delay may be compensated for without adversely affecting the resulting video quality.

In other embodiments, brightness controller 504 may measure the accumulated luminance for each of a plurality of regions of the image data, and provide separate levels for driving a plurality of groups of light sources corresponding to the regions of the image data. Brightness controller 504 may also control each light source individually in some embodiments.

Where the display comprises light sources along one edge or two opposed edges of the optical package, the regions may be strips running generally parallel to the direction(s) of the light from the light sources. Brightness controller 504 may also measure the maximum luminance required for the brightest pixel(s) in each strip, and set the levels for driving the light sources to ensure that such maximums are achievable.

Figure 6:
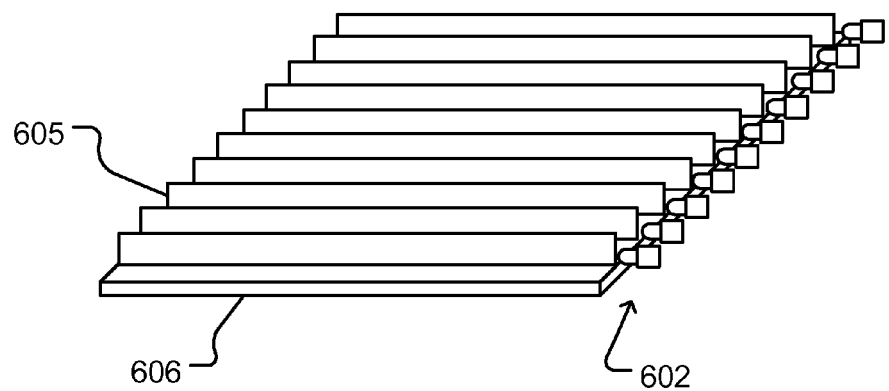
FIG. 6 shows reflective walls which may be included in the optical package in some embodiments.
Figure 7:
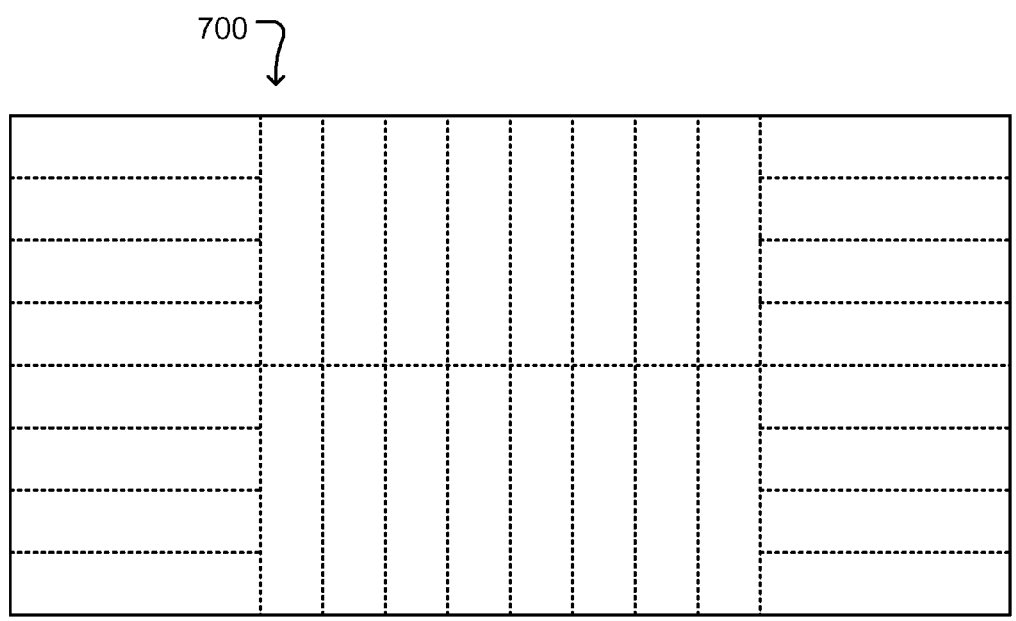
FIG. 7 shows an example pattern of regions into which a rectangular display may be divided in some embodiments.

In some embodiments where the display comprises light sources along one edge or two opposed edges of the optical package, the optical package may be physically divided into strips running generally parallel to the direction(s) of the light from the light sources by reflective walls built into the optical package. For example, FIG. 6 shows an example bottom layer 606 with reflective walls 605 extending upwardly therefrom. Walls 605 are oriented generally parallel to the direction of light from light sources 602. The spaces between walls 605 may be left empty to provide a plurality of optical cavities, or may be filled with waveguide material.

Where the display comprises light sources around four edges, the regions may be selected to be approximately equal in size and extend approximately the same distance into the display from the edges. For example, FIG. 7 shows an example pattern of regions into which a rectangular display 700 which is edge-lit by light sources (not shown) around all four sides thereof may be divided for processing by brightness controller 504.

Extraction controller 506 receives image data from input 502 and the brightness control signal from brightness control 504, and produces an extraction control signal to control the extraction of light from the optical package in order to approximate a desired image defined by image data. A low spatial resolution pattern of light is thus emitted toward the front modulator. Extraction controller 506 also provides the extraction control signal to pattern estimator 512.

Extraction controller 506 may separately calculate an extraction value for each segment of a modulatable reflection layer or other system for extracting light from the optical package. In some embodiments, extraction controller 506 is configured to calculate the extraction values for segments nearest to the light sources first, and take such extraction (and accompanying drop in total light energy available for extraction) into account when calculating the extraction values for the segments next nearest to the light sources, and so on.

In such embodiments, extraction controller 506 may comprise a mathematical model of the properties of the waveguide and its segments. Extraction controller 506 may apply the mathematical model to estimate the amount of light available at each segment and the amount of light exiting each segment. In some embodiments, extraction controller 506 may be configured to limit extraction in segments near the edges of the display where the light sources are located to ensure that enough light is available for extraction in segments closer to the middle of the display.

Pattern estimator 512 receives the brightness control signal from brightness controller 504 and the extraction control signal from extraction controller 506. Pattern estimator 512 produces an estimated pattern of light incident on the front modulator based on the brightness and extraction control signals, and the optical characteristics of any features in the path between the optical package and the front modulator. Pattern estimator 512 and/or extraction controller 506 may, for example, calculate the estimated pattern based on the intensities and point spread functions of light reflected from a modulatable reflective layer, or otherwise extracted from the optical package. Pattern estimator 512 may, for example, calculate the estimated patterns based at least in part on a model of the optical characteristics of the optical package stored in a memory accessible by pattern estimator 512.

Pattern estimator 512 provides the estimated pattern to transmission controller 508. Transmission controller 508 receives the image data from input 502, and controls the transmissivities of each of the elements of the front modulator to produce the desired image.

Transmission controller 508 may determine the transmissivities of the elements of the front modulator, for example, but dividing the desired image by the estimated pattern or, equivalently, multiplying the desired image by an inverse of the estimated pattern.

Figure 8:
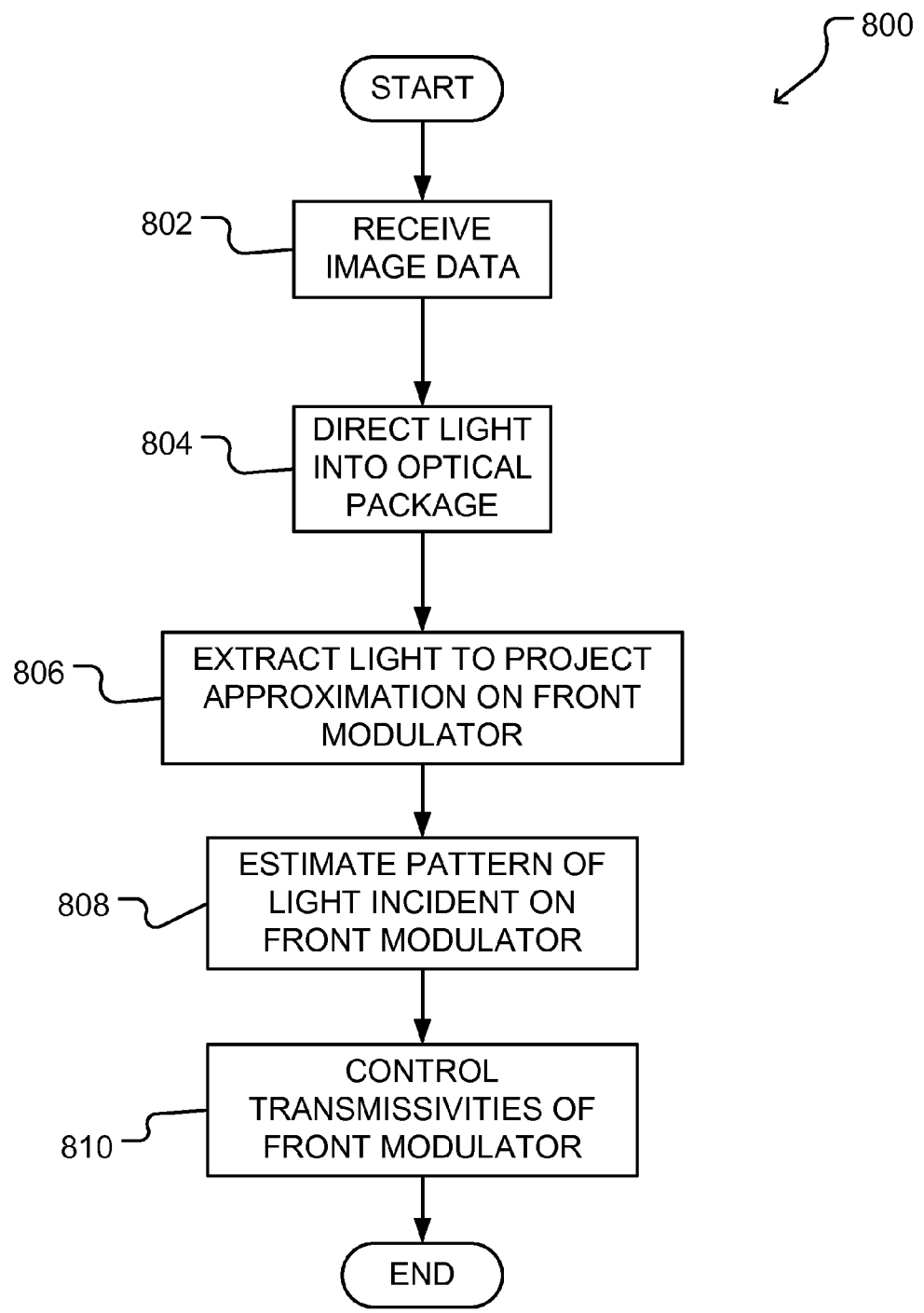
FIG. 8 is a flowchart illustrating a method according to one embodiment.

FIG. 8 is a flowchart illustrating an example method 800 of displaying an image according to one embodiment. Method 800 may be carried out by a control system of a display such as one of displays 100, 200, 300 or 400 described above, or displays similar thereto.

At block 802 image data specifying a desired image is received. At block 804 light sources are driven to direct light into the optical passage. As noted above, the light sources may be controlled to project a constant level of light, or may be controlled based on the image data to project a varying level of light, either together, in groups, or individually. At block 806 an extractor is controlled to project light which approximates the desired image onto the front modulator. At block 808 a pattern estimator estimates a pattern of light incident on the front modulator. Block 808 may be performed in advance. At block 810 a transmission controller controls the front modulator based on the image data and the estimated pattern to produce the desired image.

Aspects of the invention may also be provided in the form of a program product. The program product may comprise any medium which carries a set of computer-readable information comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable information on the program product may optionally be compressed or encrypted.

A control system such as control system 500 may comprise processors that execute software instructions such as microprocessors, image processors, graphics processors, digital signal processors, CPUs or the like; hard-wired logic circuit or logic pipelines of the like; configurable logic circuits such as suitably configured field-programmable gate arrays (FPGAs); combinations of the above, or the like. Where a component (e.g. a device, controller, light source modulation layer, display modulation layer, light source, LED, LCD pixel, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in light of the foregoing disclosure, many alterations and modifications are possible in the practice of this invention without departing from the spirit or scope thereof. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A display comprising:
   an optical package having a top layer on a side, and a bottom layer on an opposite side, the top layer comprising a front modulator having a plurality of individually-controllable elements, each of the individually-controllable elements having a variable transmissivity;

a plurality of light sources positioned along at least one edge of the optical package, the light sources configured to direct light into the optical package;

an extractor in at least one of the top layer and the bottom layer, the extractor having a plurality of individually-controllable segments configured to direct varying levels of light toward the front modulator; and, a control system connected to control the front modulator and the extractor, the control system configured to receive image data specifying a desired image, control the extractor to project a low spatial resolution pattern of light which is defined by said received image data and approximates the desired image onto the front modulator, estimate a pattern of light incident on the front modulator, and control the front modulator based on the estimated pattern, wherein said extractor and said front modulator comprise a locally dimmable modulator, where said extractor substantially forms said low spatial resolution pattern and said front modulator substantially forms a high spatial resolution pattern of said desired image, wherein the control system is configured to control the light sources based on the image data, wherein the control system comprises a brightness controller configured to measure an accumulated luminance for each of a plurality of regions of the image data and provide separate driving levels to a plurality of groups of light sources, each group corresponding to a region of the image data.

2. A display according to claim 1 wherein the accumulated luminance is measured over all pixels of a region.

3. A display according to claim 1 wherein the driving level for each light group is determined based on the accumulated luminance of the region corresponding to the light group.

4. A display according to claim 1 wherein each region comprises a strip running in a direction parallel to a direction of light from the associated group of light sources.

5. A display according to claim 4 wherein the strips physically divide the optical package by reflective walls that are built into the optical package.

6. A display according to claim 1 wherein the optical package comprises a waveguide and the extractor comprises an electrophoretic layer adjacent to a top surface of the waveguide.

7. A display according to claim 1 wherein the optical package comprises a waveguide and the extractor comprises an electrophoretic layer adjacent to a bottom surface of the waveguide.

8. A display according to claim 1 wherein the optical package comprises a waveguide having structured top and bottom surfaces configured to produce a desired extraction profile.

9. A display comprising:

an optical package having a top layer on a side, and a bottom layer on an opposite side, the top layer comprising a front modulator having a plurality of individually-controllable elements, each of the individually-controllable elements having a variable transmissivity;

a plurality of light sources positioned along at least one edge of the optical package, the light sources configured to direct light into the optical package;

an extractor in at least one of the top layer and the bottom layer, the extractor having a plurality of individually-controllable segments configured to direct varying levels of light toward the front modulator; and, a control system connected to control the front modulator and the extractor, the control system configured to receive image data specifying a desired image, control the extractor to project a low spatial resolution pattern of light which is defined by said received image data and approximates the desired image onto the front modulator, estimate a pattern of light incident on the front modulator, and control the front modulator based on the estimated pattern, wherein said extractor and said front modulator comprise a locally dimmable modulator, where said extractor substantially forms said low spatial resolution pattern and said front modulator substantially forms a high spatial resolution pattern of said desired image, wherein the control system is configured to control the light sources based on the image data, wherein the control system comprises a brightness controller configured to measure an accumulated luminance or average luminance or weighted average luminance or maximum luminance of pixels of the image data and provide driving levels to the light sources based on the measured luminance, wherein the brightness controller is connected to provide a brightness control signal to an extraction controller and a pattern estimator, wherein the extraction controller is configured to control the extractor based on the image data and the brightness control signal, and connected to provide an extraction control signal to the pattern estimator, wherein the pattern estimator is configured to estimate the pattern of light incident on the front modulator based on the image data, the brightness control signal and the extraction control signal, wherein at least one of the extraction controller and the pattern estimator is configured to calculate the estimated pattern based on intensities and point spread functions of the light extracted from the optical package.

10. A display according to claim 9 wherein the estimated pattern is based at least on a model of the optical characteristics of the optical package stored in a memory accessible by the pattern estimator.

11. A display according to claim 9 wherein the pattern estimator is connected to provide the estimated pattern to a transmission controller configured to control the transmissivities of the individually-controllable elements of the front modulator.

12. A display according to claim 1 wherein the optical package comprises an open cavity between the top layer and the bottom layer, and the extractor comprises a modulatable reflective layer in the bottom layer of the optical package.

13. A display according to claim 12 wherein the modulatable reflective layer comprises a reflective-type LCD.

14. A display according to claim 12 wherein the modulatable reflective layer comprises an electrowetting display.

15. A display according to claim 12 wherein the modulatable reflective layer comprises an electrophoretic display.

16. A display according to claim 12 wherein the modulatable reflective layer comprises electronic paper.

17. A display according to claim 12 wherein the modulatable reflective layer is configured to provide a contrast ratio of at least 5:1.

18. A display according to claim 12 wherein the modulatable reflective layer is configured to produce a pattern of light which is smoothly varying between adjacent individually-controllable segments.

19. A method of displaying an image, the method comprising:
  providing a display comprising:
    an optical package having a top layer on a side, and a bottom layer on an opposite side, the top layer comprising a front modulator having a plurality of individually-controllable elements, each of the individually-controllable elements having a variable transmissivity;
    a plurality of light sources positioned along at least one edge of the optical package, the light sources configured to direct light into the optical package; and,
    an extractor in at least one of the top layer and the bottom layer, the extractor having a plurality of individually-controllable segments configured to project a low spatial resolution pattern of light which is defined by said received image data and approximates the desired image onto the front modulator, estimate a pattern of light incident on the front modulator, and control the front modulator based on the estimated pattern, wherein said extractor and said front modulator comprise a locally dimmable modulator, where said extractor substantially forms said low spatial resolution pattern and said front modulator substantially forms a high spatial resolution pattern of said desired image;
  receiving image data specifying a desired image;
  controlling the extractor to project light which approximates the desired image onto the front modulator;
  estimating a pattern of light incident on the front modulator;
  controlling the front modulator based on the estimated pattern;
  controlling the light sources based on the image data;
  measuring an accumulated luminance for each of a plurality of regions of the image data; and,
  providing separate driving levels to a plurality of groups of light sources, each group associated with a region of the image data.

20. A method according to claim 19 wherein the accumulated luminance is measured over all pixels of a region.

21. A method according to claim 19 wherein the driving level for each light group is based on the accumulated luminance of the region corresponding to the light group.

* * * * *